United States Patent [19]

Schreiner et al.

[11] Patent Number: 5,203,148
[45] Date of Patent: Apr. 20, 1993

[54] COTTON HARVESTER ROW UNIT WITH ROW FINDER

[75] Inventors: Joel M. Schreiner, Ankeny; Jeffrey S. Wigdahl, Ames, both of Iowa

[73] Assignee: Deere & Company, Moline, Ill.

[21] Appl. No.: 822,007

[22] Filed: Jan. 16, 1992

[51] Int. Cl.5 ............................................. A01D 75/14
[52] U.S. Cl. ......................................... 56/10.2; 56/28; 172/5; 180/131
[58] Field of Search ............ 56/10.2, 28, 30, DIG. 15; 175/5; 181/131

[56] References Cited

U.S. PATENT DOCUMENTS

| | | | |
|---|---|---|---|
| 3,324,636 | 6/1967 | Hohn | 56/28 |
| 4,126,984 | 11/1978 | Gail | 56/DIG. 15 |
| 4,166,349 | 9/1979 | Coenenberg et al. | 56/DIG. 15 |
| 4,197,690 | 4/1980 | Eisert et al. | 56/10.2 |
| 4,505,094 | 3/1985 | Demorest | |
| 4,528,804 | 7/1985 | Williams | |
| 4,663,918 | 5/1987 | Williams et al. | |
| 4,821,807 | 4/1989 | Trumm | |

OTHER PUBLICATIONS

Literature: Orthman "CSC Harvester Guidance" Jun. 1991.

Primary Examiner—David J. Bagnell

[57] ABSTRACT

In a cotton harvester row unit, feelers on lower ends of a pendulum-type of row finder are provided with extensions which project generally at right angles to the forward direction through apertures in the row unit throat sidewall area. The conventional stalk lifters are removed to reduce debris accumulation, and the extensions are located directly above the areas where the stalk lifters are normally positioned to function as lifters. The feeler structure also prevents trash from feeding into and collecting between the throat wall and the end of a feeler.

8 Claims, 1 Drawing Sheet

COTTON HARVESTER ROW UNIT WITH ROW FINDER

BACKGROUND OF THE INVENTION

1) Field of the Invention

The present invention relates generally to row finding devices and more specifically to a row finder probe for use with automatic steering systems for cotton harvesters and the like.

2) Related Art

To help an operator of agricultural row crop equipment maintain proper alignment of machinery with the rows, numerous row finding devices have been employed. These devices, which help to reduce operator fatigue and increase machine productivity, often include a probe or feeler for contacting a row of the crop and providing a signal responsive to relative movement of the equipment and row from an optimal position. The signal is utilized to provide a steering change to move the equipment toward the desired optimal position relative to the row. Recently, such devices have been made commercially available for automatically guiding a cotton harvester. An example of a cotton harvest guidance system is the Orthman® CSC Harvester Guidance, available from Orthman Manufacturing, Inc. of Lexington, Nebr. Steering is controlled automatically by a hydraulic control module operably connected to the hydraulic steering cylinder. A pendulum probe is connected to the harvester row unit for rocking about a generally fore-and-aft extending axis and includes feelers that extend along opposite sides of the lower portions of the cotton plants in one of the rows of cotton being harvested. If the row unit moves off center from the desired position the pendulum pivots to change the setting on a potentiometer. A microprocessor responsive to the potentiometer setting is connected to the hydraulic control module which, using a proportional valve, operates the steering cylinder to make the necessary correction to move the row unit back to a centered position.

One problem that has surfaced with respect to the pendulum type feeler system on a cotton picker row unit is susceptibility to clogging which renders the system inoperative. The feelers must be located very close to the base of the cotton plants for proper pendulum action. Stalk lifters are also located near the bottom of the row units, and clumps of debris frequently lodge between one of the feelers and the corresponding lifter. The feelers also diverge outwardly in the forward direction to facilitate receipt of the bases of the cotton plants, and the outwardly diverging portions terminate at locations offset from the side of the row unit throat area so that debris catches easily and renders the system inoperative.

BRIEF SUMMARY OF THE INVENTION

It is therefore an object of the invention to provide an improved feeler assembly for a row guidance system on a harvester. It is a further object to provide such a system which has increased immunity to being rendered inoperative by debris.

It is still another object to provide an improved feeler assembly for a row guidance system in combination with a cotton harvester row unit having stalk lifter structure. It is another object to provide such an assembly which overcomes the problem of debris lodging between the feelers and the stalk lifters on the row unit without sacrificing the advantages of the stalk lifters.

In accordance with the above objects, the feelers on lower ends of a pendulum-type of row finder are provided with extensions which project through apertures in the row unit throat sidewall area. Preferably, the extensions are at right angles to the forward direction at the throat apertures to avoid elongated slots where trash can accumulate. The stalk lifters are removed, and the extensions are located above the areas where the stalk lifters are normally positioned to provide the function of the lifters. The structure avoids problems of trash feeding and collecting between the sidewalls and the end of the feelers that would otherwise render the steering system inoperative.

These and other objects, features and advantages of the present invention will become apparent to one skilled in the art upon reading the following detailed description in view of the drawings.

DETAILED DESCRIPTION OF THE DRAWINGS

Description of the Prior Art

Figure 1:
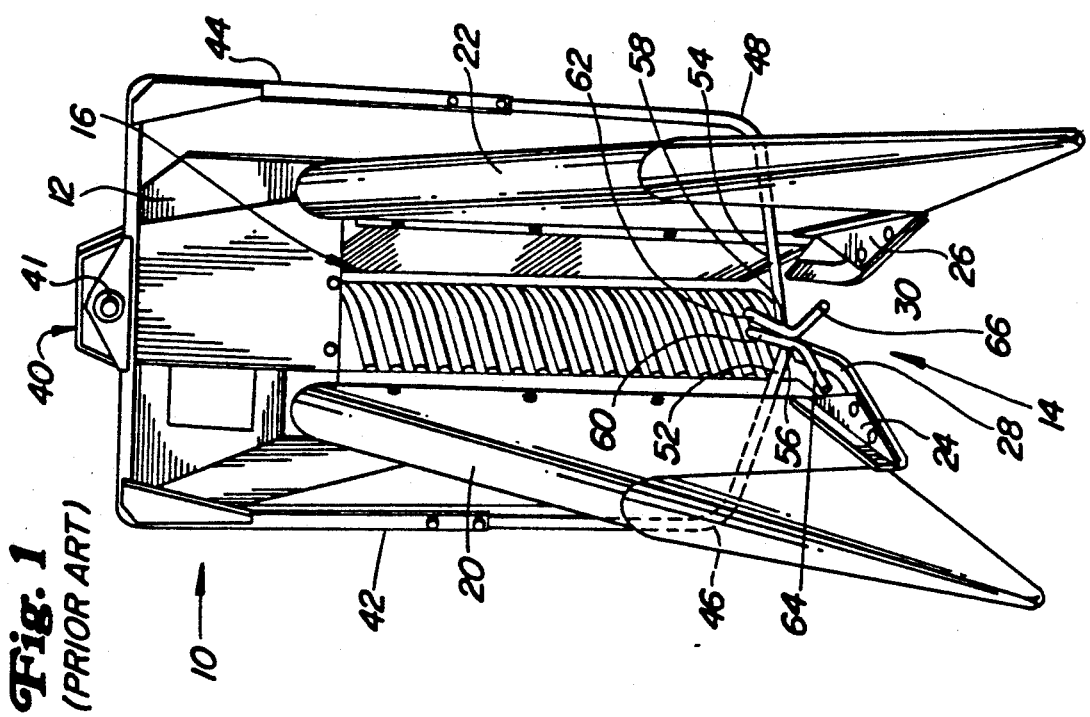
FIG 1 is a front view of a portion of a cotton harvester row unit with the prior art pendulum type of row finder probe attached.

Referring now to FIG. 1, therein is shown a conventional cotton picker row unit 10 having a row unit housing 12 with a forwardly opening plant passage 14. Conventional cotton harvesting structure including upright picker drums 16 is supported adjacent the plant passage for removing cotton from a row of cotton plants. Forward plant guides 20 and 22 are connected to the front of the housing 12 on either side of the plant passage for guiding the plants into the passage opening. Angle brackets 24 and 26 are also connected to the housing at the lower edge of the opening and support stalk lifters 28 and 30 which lift lower portions of the cotton plants for more efficient harvesting of the cotton.

A pendulum type row feeler assembly 40 is pivotally connected to the upper forward area of the housing 12 for rocking about a fore-and-aft axis 41. The assembly 40 includes sidelegs 42 and 44 extending downwardly on either side of the plant guides 20 and 22 to lower ends 46 and 48. Lower rod-like arms 52 and 54 project inwardly through the lower portions of the plant guides 20 and 22 to inwardmost ends 56 and 58 which terminate at transversely offset locations between the inside walls of the guides 20 and 22. A pair of fore-and-aft extending and forwardly diverging plant feelers 60 and 62 are fixed at central locations to the ends 56 and 58 above the stalk lifters 28 and 30. Ends 64 and 66 open in the forward direction to help locate the feelers 60 and 62 generally centrally with respect to the stems of the cotton plants. The distance between the feelers 60 and 62 is held generally constant by the pendulum structure, and as the row unit moves off center with respect to the row of cotton, a corresponding pivoting of the pendulum occurs to change a setting on a potentiometer operably connected to the pivot 41.

The ends 64 and 66 of the plant feelers 60 and 62 terminate inwardly of the corresponding inside walls of the guides 20 and 22 so that stalks and other debris often accumulate and prevent proper swinging action of the pendulum type feeler assembly 40. The area between the stalk lifters 28 and 30 and the feelers 60 and 62 also is prone to fouling with debris.

Description of the Improved Feeler Assembly

Figure 2:
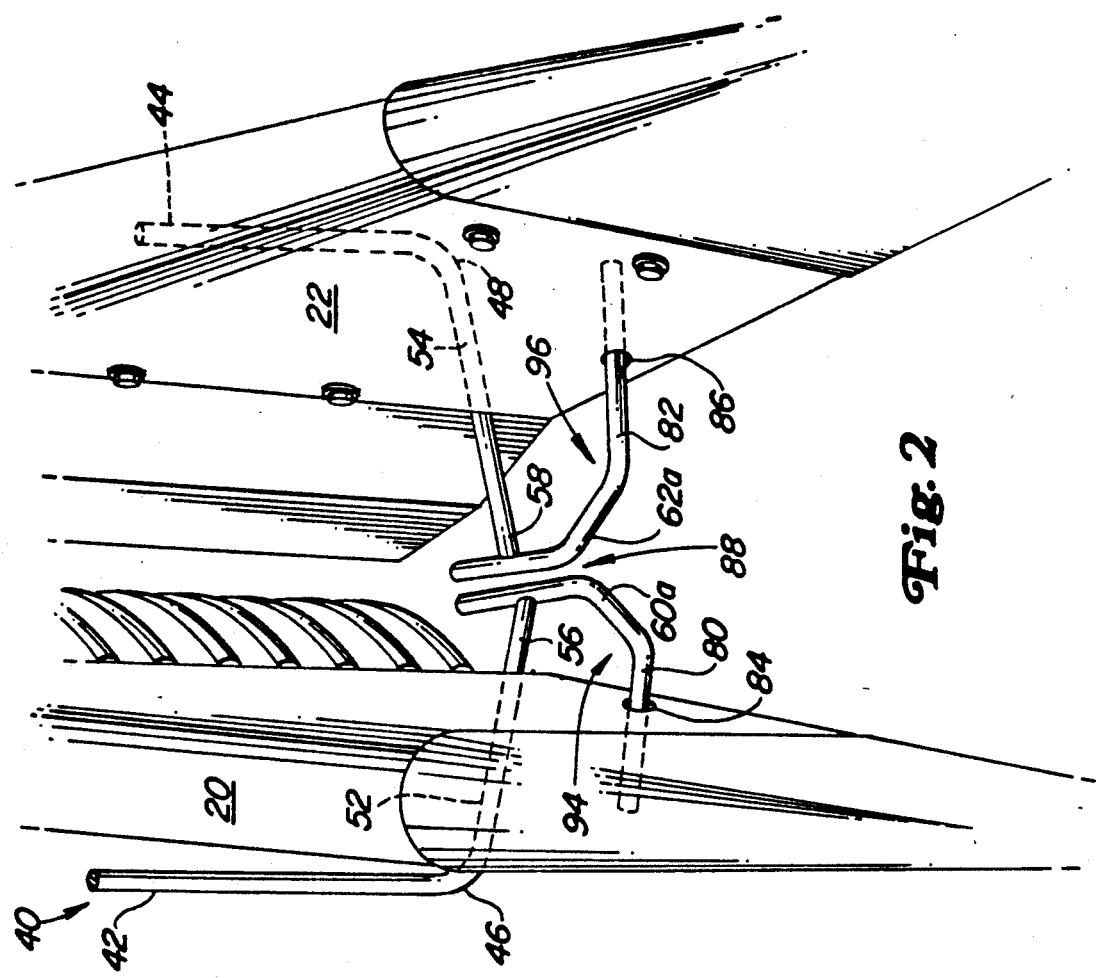
FIG 2 is a view similar to FIG. 1 but enlarged and showing the improvement of the present invention.

Referring to FIG. 2, therein is shown a feeler assembly 40a generally similar in construction to the above-described assembly 40. However, the plant feelers 60a and 62a include forward extensions 80 and 82 which diverge outwardly in opposite directions and project generally at right angles to the forward direction through apertures 84 and 86 in the inside walls of the plant guides 20 and 22. The apertures 84 and 86 are only slightly larger in cross-section than that of the corresponding extensions to allow free pivoting action of the pendulum without presenting an area that is susceptible to clogging. The uninterrupted pattern of the feelers 60a and 62a from the diverging area through the sidewalls prevents debris from collecting between the feelers 60a and 62a and the plant guides 20 and 22.

As can be appreciated from FIG. 2, the extensions 80 and 82 in combination with the remainder of the feelers 60a and 62a provide closed boundary areas (94 and 96), from the respective sidewalls of the plant guides 20 and 22 to the row receiving area (indicated generally at 88) between the feelers, which act as stalk lifters. Therefore, the stalk lifters 28 and 30 (FIG. 1) are removed to reduce the clogging that otherwise would take place at the lower, forward portion of the plant guides 20 and 22. The feelers 60a and 62a with the extensions 80 and 82 provide sufficient lifting action to overcome any detrimental effect of the lifter removal.

Having described the preferred embodiment, it will become apparent that various modifications can be made without departing from the scope of the invention as defined in the accompanying claims.

What is claimed is:

1. In an agricultural implement row unit with a plant passage having a generally upright crop-receiving throat with first and second sidewalls located on opposite sides of the passage, and a guidance system with a row following probe including a pair of feelers connected for movement together relative to the sidewalls on opposite sides of the row adjacent the throat, the feelers movable generally transversely over a range of positions between the sidewalls, the improvement comprising:

an extension located on the forward end of one of the feelers and extending outwardly therefrom, and a receiving area located in the first sidewall for receiving the feeler extension therethrough, wherein the extension remains in the receiving area as the feelers move over the range of positions.

2. The invention as set forth in claim 1 wherein the extension is supported at the lowermost portion of the throat and functions as a stalk lifter for raising a portion of the plants received within the passage.

3. The invention as set forth in claim 2 wherein the feelers are adapted for support on either side of a row of cotton plants near the base of the plants and the extension defines a cotton stalk lifter.

4. The invention as set forth in claim 1 including a second extension located on the other one of the feelers and extending through the second sidewall.

5. The invention as set forth in claim 4 wherein the extensions comprise rod-like members with outermost ends projecting substantially perpendicular to the forward direction, and wherein the sidewalls include apertures with cross-sectional area slightly larger than that of the cross-sectional area of the rod-like members.

6. In a cotton picker having a row unit with an upright picking drum and a plant passage having a generally upright crop-receiving throat with opposite sidewalls located at the side of the passage, and a guidance system with a row following probe including a pair of plant-contacting feelers connected for movement relative to the sidewalls on opposite sides of the row adjacent the throat, the feelers movable generally transversely over a range of positions relative to the sidewalls, the improvement comprising:

extensions located on the forward end of the feelers and extending outwardly therefrom toward the sidewalls, and receiving areas located in the sidewalls for receiving the feeler extensions therethrough, wherein the extensions remain in the receiving area as the feeler moves over the range of positions.

7. The invention as set forth in claim 6 wherein the extensions and feelers define with the sidewalls a generally closed boundary area that provide plant lifting action for lifting a portion of the received cotton plant as the plant moves between the feelers.

8. The invention as set forth in claim 6 wherein the receiving areas include apertures, each aperture having an area approximately equal to but slightly larger than the cross-section of the corresponding extension to facilitate transverse movement of the feelers while preventing debris from lodging between the feelers and the sidewalls.

* * * * *